United States Patent [19]
Hofbauer et al.

[11] Patent Number: 5,794,444
[45] Date of Patent: Aug. 18, 1998

[54] METHOD FOR UTILIZING WASTE-GAS HEAT FROM HEAT-GENERATING AND REFRIGERATING MACHINES

[75] Inventors: Peter Hofbauer, Roesrath-Hoffnungstaal; Klaus Heikrodt, Krefeld; Rolf-Peter Strauss, Frankenberg; Bernd Thomas, Aachen, all of Germany

[73] Assignees: Robert Bosch GmbH, Stuttgart; Viesmann Werke GmbH & Co., Allendorf/Eder, both of Germany

[21] Appl. No.: 765,223

[22] PCT Filed: May 6, 1996

[86] PCT No.: PCT/DE96/00787

§ 371 Date: Jan. 6, 1997

§ 102(e) Date: Jan. 6, 1997

[87] PCT Pub. No.: WO96/35086

PCT Pub. Date: Nov. 7, 1996

[30] Foreign Application Priority Data

May 5, 1995 [DE] Germany ............... 195 16 499.7

[51] Int. Cl.⁶ .................. F01B 29/10; F25B 9/00; F02G 1/04
[52] U.S. Cl. .................. 60/517; 60/526; 62/6
[58] Field of Search ................ 62/6; 60/517, 526

[56] References Cited

U.S. PATENT DOCUMENTS

| | | | |
|---|---|---|---|
| 2,557,607 | 6/1951 | Lubbock et al. | 60/526 |
| 4,245,477 | 1/1981 | Glode. | |
| 4,345,426 | 8/1982 | Egnell. | |
| 4,977,742 | 12/1990 | Meijer | 60/525 |
| 5,005,349 | 4/1991 | Momose et al. | 60/517 |
| 5,383,334 | 1/1995 | Kaminishizono et al. | 60/517 |
| 5,590,526 | 1/1997 | Cho | 60/517 |

FOREIGN PATENT DOCUMENTS

| | | | |
|---|---|---|---|
| 459708 | 9/1949 | Canada | 60/517 |
| 1233206 | 1/1967 | Germany. | |
| 2262545 | 7/1973 | Germany | 60/517 |
| 4328993 | 3/1995 | Germany. | |
| 58-82049 | 5/1983 | Japan. | |
| 62-20660 | 1/1987 | Japan | 60/517 |
| 63-246450 | 10/1988 | Japan | 60/517 |
| 136195 | 12/1919 | United Kingdom. | |
| 92/15826 | 9/1992 | WIPO. | |
| 93/18354 | 9/1993 | WIPO. | |

*Primary Examiner*—Christopher Kilner
*Attorney, Agent, or Firm*—Spencer & Frank

[57] ABSTRACT

The invention relates to method and an arrangement for utilizing the heat comprised i the exhaust gas of the combustion chamber of a heating and refrigerating engine working on the basis of a regenerative cyclic gas process by preheating the combustion air supplied to the combustion chamber, with the process gas, which is displaced from the hot working volume or supplied to this working volume, flowing through a regenerator arranged inside of a pressure-proof housing in the region of the hot piston. In order to achieve an effective utilization of the exhaust gas heat without additional apparatus complexity and without insulation of the engine in the region of the warm regenerator while maintaining the temperature profile necessary for the operation of the regenerator, the combustion air to the cooling of the pressure vessel wall surrounding the lower section of the regenerator is used, which cooling corresponds to the lower section of the temperature profile of the regenerator. For maintaining the upper section of the temperature profile necessary for the operation of the regenerator, the exhaust gas flows around the upper section of the pressure vessel wall surrounding the regenerator while, at the same time, heat is extracted from the exhaust gas in this region by means of the combustion air conducted on the outer side of the exhaust gas flow in the reverse direction.

4 Claims, 1 Drawing Sheet

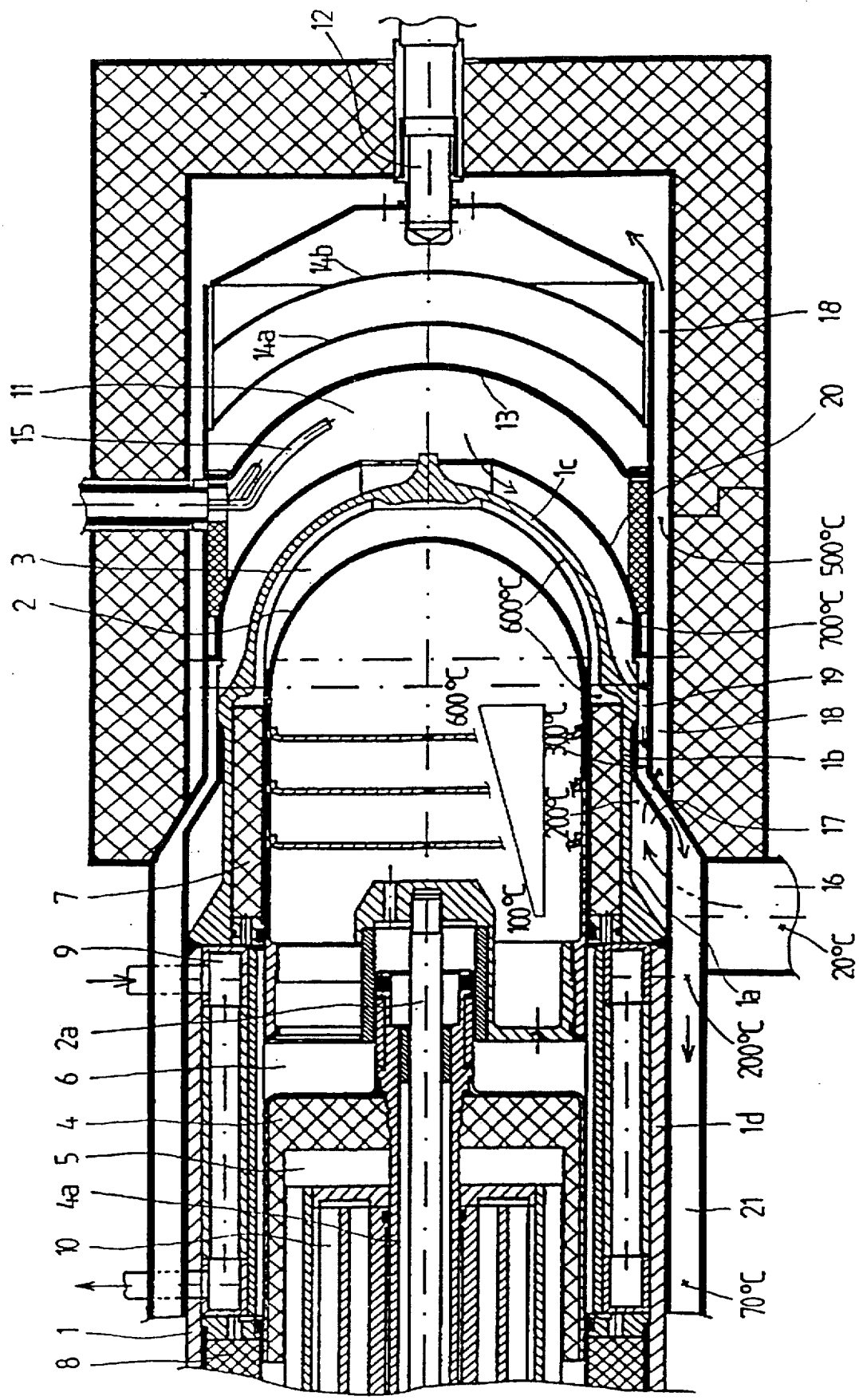

METHOD FOR UTILIZING WASTE-GAS HEAT FROM HEAT-GENERATING AND REFRIGERATING MACHINES

The invention relates to method for utilizing the heat comprised in the exhaust gas of the combustion chamber of a heating and refrigerating engine working on the basis of a regenerative cyclic gas process by preheating the combustion air supplied to the combustion chamber, with the process gas, which is displaced from the hot working volume or supplied to this working volume, flowing through a regenerator arranged inside of a pressure-proof housing in the region of the hot piston.

Heating and refrigerating engines operating according to a regenerative cyclic gas process, for example, according to the Stirling or Vuilleumier cycle process, have been known for a long time, for example, from the GB Patent 136 195. Such engines have two pistons which are linearly movable in a pressure-proof housing, which pistons together delimit a warm working volume and of which the one piston in the housing delimits a hot working volume acted upon by heat and the other piston delimits a cold working volume, with the three working volumes being connected with one another while regenerators and heat exchangers are connected in line and with a drive and/or a control for the pistons being provided.

In spite of the indisputable advantages of the heating and refrigerating engines operating on the basis of a regenerative cyclic gas process, these have so far not been implemented in practice, mainly because of constructive difficulties which have hitherto prevented the practical realization of the theoretical advantages of such engines.

In order to improve the efficiency of heating and refrigerating engines operating on the basis of a regenerative cyclic gas process it is known to utilize the heat comprised in the exhaust gas of the combustion chamber by preheating the combustion air supplied to the combustion chamber. For this purpose, an additional heat exchanger was arranged in the pressure-proof housing of the engine; furthermore, the housing was provided with extensive insulation elements to protect it from thermal radiation and thermal conduction.

It is the object of the invention to further develop the method of the type described at the outset for utilizing the heat comprised in the exhaust gas of the combustion chamber of a heating and refrigerating engine operating on the basis of a regenerative cyclic gas process such that a preheating of the combustion air is possible without providing an additional volume for a heat exchanger and for insulation elements of the housing in the region of the regenerators and heat exchangers connected to the hot working volume.

The solution of this object provided by the method according to the invention is characterized in that the combustion air to the cooling of the pressure vessel wall surrounding the lower section of the regenerator, which cooling corresponds to the lower section of the temperature profile of the regenerator, is used while the temperature profile necessary for the operation of the regenerator is maintained and that, for maintaining the upper section of the temperature profile necessary for the operation of the regenerator, the exhaust gas flows around the upper section of the pressure vessel wall surrounding the regenerator while, at the same time, heat is extracted from the exhaust gas in this region by means of the combustion air conducted on the outer side of the exhaust gas flow in the reverse direction.

With the method according to the invention, the heat comprised in the exhaust gas of the combustion chamber is utilized in an optimum manner by preheating the combustion air supplied to the combustion chamber without using additional heat exchangers or insulation elements for this heat transfer because the cooling of the regenerator takes place in the lower section of its temperature profile by direct action of the cold combustion air upon the pressure vessel wall surrounding this section of the regenerator. By cooling this section of the pressure vessel wall, heat losses due to heat conduction are prevented at the same time which, without this direct cooling, would occur due to the conduction of the heat away from the pressure vessel wall surrounding the hot working volume in the direction of the colder pressure vessel wall surrounding the warm working volume. In order to maintain the upper section of the temperature profile of the regenerator necessary for the operation of the regenerator, exhaust gas flows around the upper section of the pressure vessel wall surrounding the regenerator. This means that a direct cooling of the pressure vessel wall surrounding the regenerator does not take place in the upper section of the temperature profile. Instead, in this region, the already heated combustion air supplied to the combustion chamber extracts heat from the exhaust gas flowing in the reverse direction in that the combustion air flows around the outer side of the exhaust gas flow. In this section of the pressure vessel wall forming the upper section of the temperature profile of the regenerator, the pressure vessel wall is thus acted upon by the exhaust gas flow around which, in turn, combustion air is flowing on its outer side. In a region of the regenerator to be set in accordance with the parameters, the charging of the pressure vessel wall thus alternates between on the one hand combustion air and on the other hand exhaust gas; to accomplish this in practice, the respective channels must merely be crossed.

On the whole, the method according to the invention results in an optimum utilization of the heat comprised in the exhaust gas of the combustion chamber by preheating the combustion air supplied to the combustion chamber, thus resulting in a high efficiency and, at the same time, a simple construction of the engine.

According to a further feature of the invention, the exhaust gas cooled by heating the combustion air can subsequently flow around the pressure vessel wall surrounding the warm heat exchanger for further heat utilization. This means that an insulation between the warm heat exchanger and the pressure vessel wall can be dispensed with while the efficiency is increased simultaneously; moreover, a separate heat exchanger for the exchange of heat between the exhaust gas and, for example, the liquid of the warm heat exchanger to be heated can be omitted.

According to a further feature of the invention, the arrangement for implementing the method in accordance with the invention is characterize in that the hot regenerator is arranged directly on the inside wall of the pressure vessel and that this section of the pressure vessel wall is directly surrounded in the lower partial region by the combustion air channel and in the upper partial region by the exhaust gas channel which, in turn, is enclosed on its outer side by the combustion air channel.

And finally, the invention proposes in a modification of the arrangement according to the invention to subsequently rest the exhaust gas channel in the lower partial region of the pressure vessel wall, which surrounds the regenerator, and separated from the pressure vessel wall by the combustion air channel directly against the pressure vessel wall surrounding the warm heat exchanger.

The drawing shows an embodiment of a heating and refrigerating engine operation the basis of the method according to the invention in a schematic longitudinal section which also indicates the features of the design according to the invention.

The drawing illustrates the upper section of a pressure vessel 1 in whose lower section, not shown in the drawing, a transmission is disposed. In the upper section of the pressure vessel 1, a hot piston 2 is arranged which delimits a hot working volume 3. This hot piston 2 is connected to the transmission, not shown in the drawing, via its piston and rod 2a. This piston rod 2a penetrates a cold piston 4 which is also connected to the transmission by way of a hollow piston rod 4a which surrounds the piston rod 2a. A cold working volume 5 is formed in the interior of this cold piston 4. Between them, the pistons 2 and 4 form a warm working volume 6.

The three working volume 3, 6 and 5 are connected to one another by regenerators 7 and 8 as well as heat exchangers 9 and 10 arranged in line. While the hot regenerator 7 as well as the cold regenerator 8 and the warm heat exchanger 9 are arranged directly on the inner side of the pressure vessel 1, the cold heat exchanger 10 is disposed in a fixed section inside of the cold piston 4, which section is penetrated by the piston rods 2a and 4a.

The regenerators 7 and 8 connected in series with the heat exchangers 9 and 10 have a ring-shaped design; through them flows in the axial direction the process gas under high pressure. This process gas also acts upon one side of the heat exchangers 9 and 10 which on their other side, are respectively acted upon by a liquid. In the drawing, the inflow and outflow of these liquids is indicated by arrows.

In the embodiment shown, the heat supply to the hot working volume 3 takes place by combustion of a fossil fuel, preferably a gas in a combustion chamber 11. The drawing shows the associated burner nozzle 12, a hollow body 13 forming the reaction surface of the combustion chamber 11 embodied as radiant burner as well as two combustion gas distributors 14a and 14b which are provided to even out the combustion gas when it is supplied to the hollow body 13. Finally, the drawing illustrates an ignition electrode 15 for igniting the gas-air mixture supplied to the combustion chamber 11.

The combustion air necessary for the operation of the combustion chamber 11 is supplied to the engine via an air supply connection piece 16 an reaches a ring-shaped combustion air channel 17 whose radially inwardly disposed wall is formed by a section of the wall of the pressure vessel 1, which in the drawing is identified by reference numeral 1a. In the flow direction of the combustion air, this combustion air channel 1 transitions to a ring channel 18 which is separated by an exhaust gas channel from the vessel wall section 1b adjoining the vessel wall section 1a. In this exhaust gas channel 19 flows the exhaust gas coming from the combustion chamber 11, which exhaust gas is forcedly supplied by a guide plate 20 to the outer surface of the arched head 1c of the pressure vessel 1. The exhaust gas channel 19, which rests directly against the vessel wall in the region of the vessel wall section 1b, is guided away from the vessel wall at the transition to vessel wall section 1a and subsequently transitions to a channel section 21, which surrounds the combustion air channel 17 on its radially outwardly disposed side, and, in the flow direction of the exhaust gas, subsequently rests against the surface of the vessel wall section 1d at whose inner side the warm heat exchanger 9 is disposed.

By way of this feature and design of the combustion air channel 17 transitioning to the ring channel 18 as well as of the exhaust gas channel 19 transitioning to channel section 21 it is accomplished that the combustion air is utilized for the cooling of the vessel wall section 1a surrounding the lower section of regenerator, whereas exhaust gas flows around the vessel wall section 1b surrounding the upper section of the regenerator 7. In this region, the exhaust gas is simultaneously cooled by the combustion air guided on the outer side of the exhaust gas flow in reverse direction. The exhaust gas cooled in this manner by heating the combustion air then flows around the vessel wall section 1d surrounding the warm heat exchanger 9 so that heat is still extracted from the exhaust gas even in this region.

The drawing reflects the temperature profile that is necessary for the operation of regenerator 7. It shows that the temperature in regenerator 7 is approximately 600° C. at the end facing the hot working volume and approximately 100° C. at the end facing the warm working volume 6. The combustion air, which is admitted through the air supply connection piece 16 at a temperature of approximately 20° C., is heated to approximately 200° C. in the combustion air channel 17 and has a temperature of approximately 500° C. at the end of ring channel 18. The exhaust gas, which leaves the combustion chamber 11 at a temperature of approximately 700° C., is cooled in the region of the exhaust Was channel 19 to approximately 300° C. and has a temperature of approximately 200° C. at the transition from vessel wall suction 1a to vessel wall section 1d. Since heat for the warm heat exchanger 9 is still extracted from the exhaust gas in the further region of channel section 21, the exhaust gas is cooled to a temperature of approximately 70° C. at the end of channel section 21 illustrated in the drawing.

The temperature profile needed for the operation of regenerator 7 is maintained by way of the above-described cooling of vessel wall section 1a by means of direct charging with combustion air and the subsequent change of the combustion air flow in the region of vessel wall section 1b to the outer side of the exhaust gas flow. The thus accomplished preheating of the combustion air by way of utilizing the heat comprised in the exhaust gas of the combustion chamber 11 require neither the additional apparatus complexity of a heat exchanger nor the arrangement of insulation elements of the pressure vessel housing in the region of the regenerator 7 and the heat exchanger 9. Furthermore, the action of this combustion air on vessel wall section 1a prevents heat losses from occurring due to heat conduction from the head 1c of the pressure vessel 1 in the direction of vessel wall sect on 1d, which heat losses would diminish the efficiency of the engine.

The drawing shows that the described advantages, which result in a considerable improvement in the efficiency of the engine, are accomplished by simple constructive means; for this purpose, it is merely necessary to match the corresponding wall thicknesses of the pressure vessel housing and the flow cross sections of the channels with respect to one another and to the pressure and the temperature of the process gas pulsating in this section of the engine.

List of reference numerals
1 Pressure vessel
1a Vessel wall section
1b Vessel wall section
1c Head
1d Vessel wall section
2 Hot piston
2a Piston rod
3 Hot working volume
4 Cold piston
4a Piston rod
5 Cold working volume 6 Warm working volume
7 Regenerator (hot)
8 Regenerator (cold)
9 Heat exchanger (warm)
10 Heat exchanger (cold)
11 Combustion chamber
12 Burner nozzle
13 Hollow body
14a Combustion gas distributor
14b Combustion gas distributor
15 Ignition electrode
16 Air supply connection piece
17 Combustion air channel
18 Ring channel
19 Exhaust gas channel
20 Guide plate
21 Channel section

We claim:

1. A method for utilizing the heat in the exhaust gas of the combustion chamber of a heating and refrigerating engine working on the basis of a regenerative cyclic gas process by preheating the combustion air supplied to the combustion chamber, wherein the process gas displaced from a hot working volume or supplied to this working volume flows through a regenerator arranged in the region of a hot piston, wherein the combustion air flows around a pressure vessel wall that surrounds the cooler section of the regenerator while exhaust gas flows around the hotter section of the vessel wall surrounding the regenerator, and wherein at the same time heat is extracted from the exhaust gas by the combustion air that flows counter to the exhaust gas.

2. A method according to claim 1, wherein the exhaust gas which is cooled by heating up the combustion air, subsequently flows around the section that surrounds a warm heat exchanger for a further heat utilization.

3. A heating and refrigeration engine operating on the basis of a regenerative cyclic gas process, for which the process gas displaced from a hot working volume or supplied to this working volume flows through a regenerator arranged inside a pressure vessel in the region of a hot piston, wherein the regenerator is arranged directly on the inside wall of the pressure vessel and that a cooler section of the pressure vessel wall is surrounded directly by the combustion air channel while a hotter section of the pressure vessel wall is surrounded by the exhaust gas channel which, in turn, exchanges heat with the combustion air channel.

4. A device according to claim 3, wherein a segment of the exhaust gas channel fits flush against a section of the pressure vessel wall that surrounds a warm heat exchanger.

* * * * *